United States Patent
Cheon et al.

(10) Patent No.: US 12,250,311 B2
(45) Date of Patent: Mar. 11, 2025

(54) IDENTITY-BASED ENCRYPTION METHOD BASED ON LATTICES

(71) Applicant: SEOUL NATIONAL UNIVERSITY R&DB FOUNDATION, Seoul (KR)

(72) Inventors: Jung Hee Cheon, Seoul (KR); Yongha Son, Seoul (KR); Duhyeong Kim, Seoul (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 0 days.

(21) Appl. No.: 18/590,797

(22) Filed: Feb. 28, 2024

(65) Prior Publication Data

US 2024/0205007 A1  Jun. 20, 2024

Related U.S. Application Data

(62) Division of application No. 17/269,239, filed as application No. PCT/KR2020/016488 on Nov. 20, 2020, now abandoned.

(30) Foreign Application Priority Data

Nov. 28, 2019 (KR) .......... 10-2019-0155732
Aug. 13, 2020 (KR) .......... 10-2020-0101937

(51) Int. Cl.
  *H04L 29/06* (2006.01)
  *H04L 9/06* (2006.01)
  *H04L 9/30* (2006.01)

(52) U.S. Cl.
  CPC .......... *H04L 9/3073* (2013.01); *H04L 9/0643* (2013.01); *H04L 9/3093* (2013.01)

(58) Field of Classification Search
None
See application file for complete search history.

(56) References Cited

U.S. PATENT DOCUMENTS

| | | | |
|---|---|---|---|
| 7,773,746 B2 * | 8/2010 | Futa | H04L 9/3093 708/250 |
| 12,046,414 B2 * | 7/2024 | Partovi | B60L 53/12 |
| 2003/0081785 A1 * | 5/2003 | Boneh | H04L 9/0847 380/277 |

(Continued)

OTHER PUBLICATIONS

P.A. Fouque, et al., "Falcon: Fast-Fourier lattice-based compact signatures over NTRU, Specifications v1.0", Jul. 2018, https://falcon-sign.info/falcon.pdf; accessed Sep. 20, 2024 via https://web.archive.org/web/20190620061516/ https://falcon-sign.info/falcon.pdf; pp. 1-75. (Year: 2018).*

(Continued)

*Primary Examiner* — Jeffery L Williams
(74) *Attorney, Agent, or Firm* — Steinfl + Bruno LLP (57) ABSTRACT

A calculation device is disclosed. The calculation device includes: a memory storing at least one instruction and identity information; and a processor performing the at least one instruction, wherein the processor may randomly sample small elements, generate a function-processed output value by function-processing the stored identity information, and generate an encrypted text for a message by using a master public key computed using a ring having a dimension (d) represented by a power of 2 and an integer multiplication of 3 or more, the sampled small elements and the function-processed output value.

12 Claims, 4 Drawing Sheets

(56) References Cited

U.S. PATENT DOCUMENTS

| | | | |
|---|---|---|---|
| 2005/0031122 A1* | 2/2005 | Vanstone | H04L 9/005 |
| | | | 713/163 |
| 2015/0067336 A1* | 3/2015 | Ding | H04L 9/0819 |
| | | | 713/171 |
| 2023/0125560 A1* | 4/2023 | Lablans | H04L 9/0643 |
| | | | 380/28 |
| 2023/0163966 A1* | 5/2023 | Garcia Morchon | H04L 9/0819 |
| | | | 713/171 |
| 2023/0412392 A1* | 12/2023 | Masny | H04L 9/0825 |
| 2024/0205007 A1* | 6/2024 | Cheon | H04L 9/3093 |

OTHER PUBLICATIONS

Ducas, L., Lyubashevsky, V., Prest, T. (2014). Efficient Identity-Based Encryption over NTRU Lattices. In: Sarkar, P., Iwata, T. (eds) Advances in Cryptology—ASIACRYPT 2014. ASIACRYPT 2014. Lecture Notes in Computer Science, vol. 8874. Springer, Berlin, Heidelberg. (Year: 2014).*

U.S. Appl. No. 17/269,239, filed Feb. 17, 2021, US2022002153A1, Jan. 20, 2022, Seoul National University R&DB Foundation, Jung Hee Cheon; Yongha Son; Duhyeong Kim.

* cited by examiner

Algorithm 1 KeyGen
___
Input: $n, q, d$
Output: MPK $= h \in R_q^{d-1}$ and MSK $= \mathbf{T}_{\text{MNTRU}} \in \mathbb{Z}^{dn \times dn}$
1:  for $i = 1$ to $d - 1$ do
2:  $\quad \sigma_i \leftarrow \sqrt{\frac{d}{d-i+1}} c_d \cdot q^{1/d} / \sqrt{dN}$ ▷ According to Section 3.2
3:  $\quad \mathbf{f}_i \leftarrow (f_{1,i}, \cdots, f_{d,i})$ where each coefficient of $f_{j,i} \in \mathcal{R}$ is sampled from $\mathcal{D}_{\mathbb{Z}, \sigma_i}$
4:  end for
5:  $\mathbf{S} \leftarrow [\mathbf{f}_1, \cdots, \mathbf{f}_{d-1}]$
6:  $\det \leftarrow (\det_1, \cdots, \det_d)$ where $\det_i = (-1)^{i-1} \cdot \det(\mathbf{S}_i)$
7:  $h \leftarrow \det^{-1} \cdot (\det_2, \cdots, \det_d) \in \mathcal{R}_q^{d-1}$
8:  Find a solution $\mathbf{F} = (F_1, \cdots, F_d) \in \mathcal{R}^d$ of the MNTRU equation $\sum_{i=1}^{d} \det_i \cdot F_i = q$
9:  $\mathbf{T} \leftarrow [\mathcal{A}(\mathbf{S}) \| \mathcal{A}(\mathbf{F})]$
10: return MPK $= h$ and MSK $= \mathbf{T}$

[Fig. 10]

Algorithm 2 Extract

Input: An identity $id$, the master secret key $\mathbf{T}$, the master public key $\mathbf{h}$ and a hash function $H : \{0,1\}^* \to \mathcal{R}_q$
Output: A user secret key $\mathsf{sk}_{id} \in \mathcal{R}^{d-1}$
1: if $id$ is previously queried then
2:     return $\mathsf{sk}_{id}$ in local storage
3: else
4:     $\mathbf{t} \leftarrow (H(id), 0, \cdots, 0) \in R_q^d$
5:     $\sigma \leftarrow \frac{c_d}{\pi} \cdot \sqrt{\frac{\ln 2}{2}\left(\frac{\lambda}{2} + \log_2(4\sqrt{2} \cdot dn)\right)} \cdot q^{1/d}$
6:     $\mathbf{c} \leftarrow \mathsf{GaussisanSampler}(\mathbf{T}, \sigma, \mathbf{t})$
7:     $\mathbf{s} = (s_0, s_1, \cdots, s_{d-1}) \leftarrow \mathbf{t} - \mathbf{c}$         ▷ $\langle \mathbf{s}, (1, \mathbf{h}) \rangle = t$
8:     Add $\mathsf{sk}_{id} = (s_1, \cdots, s_{d-1})$ in local storage and return $\mathsf{sk}_{id}$
9: end if

[Fig. 11]

Algorithm 3 Encrypt

Input: An identity $id$, a message $\mu \in \{0,1\}^m$, the master public key $\mathbf{h} \in R_q^{d-1}$, hash functions $H : \{0,1\}^* \to R_q$ and $H' : \{0,1\}^n \to \{0,1\}^m$
Output: A ciphertext $C = (\mathbf{c}, c')$ where $\mathbf{c} \in R_q^d$ and $c' \in \{0,1\}^m$.
1: $r, e_i \leftarrow \{-1, 0, 1\}^n$ for $0 \leq i \leq d-1$
2: $k \leftarrow \{0,1\}^n$         ▷ $k$ is an ephemeral key
3: $t \leftarrow H(id)$
4: $c_0 \leftarrow rt + e_0 + \lfloor \frac{q}{2} \rfloor \cdot k$
5: $c_0 \leftarrow 2^{\lceil \log_2 q \rceil - 3} \cdot \left\lfloor \frac{c_0}{2^{\lceil \log_2 q \rceil - 3}} \right\rfloor$     ▷ Store only 3 most significant bits of $c_0$
6: $\mathbf{c} \leftarrow (c_0, c_1, \cdots, c_{d-1})$ where $c_i = rh_i + e_i$ for $1 \leq i \leq d-1$
7: $c' \leftarrow \mu \oplus H'(k)$
8: return $C = (\mathbf{c}, c')$

[Fig. 12]

Algorithm 4 Decrypt

Input: A ciphertext $C = (\mathbf{c}, c')$, a user secret key $\mathsf{sk}_{id} \in \mathcal{R}^{d-1}$, and hash functions $H : \{0,1\}^* \to \mathcal{R}_q$ and $H' : \{0,1\}^n \to \{0,1\}^m$
Output: A message $\mu \in \{0,1\}^m$
1: $\mathbf{s}' = (1, -\mathsf{sk}_{id})$
2: $w \leftarrow \langle \mathbf{c}, \mathbf{s}' \rangle$
3: $k \leftarrow \lfloor \frac{2}{q} \cdot w \rceil$
4: return $m \leftarrow c \oplus H'(k)$

IDENTITY-BASED ENCRYPTION METHOD BASED ON LATTICES

CROSS-REFERENCE TO RELATED APPLICATIONS

The present application is a divisional of U.S. Non-Provisional patent application Ser. No. 17/269,239, filed on Feb. 17, 2021 for "IDENTITY-BASED ENCRYPTION METHOD BASED ON LATTICES", which is the U.S. national stage of International Application No. PCT/KR2020/016488 filed on Nov. 20, 2020, which, in turn, claims priority to Korean Application No. 10-2019-0155732 filed on Nov. 28, 2019, and Korean Application No. 10-2020-0101937 filed on Aug. 13, 2020, all of which are herein incorporated by reference in their entireties.

TECHNICAL FIELD

Apparatuses and methods consistent with the disclosure relate to an identity-based encryption method based on a lattice, and more particularly, to methods of generating a master secret key, a master public key and a user secret key, to which an identity-based encryption capable of securing parameter flexibility is applied based on a lattice, and methods of encrypting a message and decrypting the encrypted message by using the user secret key.

BACKGROUND

An identity-based encryption is an encryption method in which a user secret key and a public key are generated based on identity information corresponding only to a user. Therefore, even users who do not share keys with each other may make safe communication with each other. The user's identity information may be biometric information such as fingerprint information corresponding only to the user, the user's email address or phone number, etc.

The user secret key may be generated by a key generator and then provided to the user.

In the paper "Efficient Identity-Based Encryption over NTRU Lattices" published in 2014, Leo Ducas et al. proposed a method based on a number theory research unit (NTRU) lattice as one of the methods of generating the master secret key and the master public key using the identity-based encryption.

A key generation process in the related art may be performed in a polynomial ring ($\mathcal{R} := \mathbb{Z}[X]/(X^n+1)$). However, in the related art, an entire dimension needs to be a power of 2, and if not, its stability has not been proven, and there is a limitation to the parameter flexibility. For example, in case that a ring providing an approximately 80-bit security level has a dimension of n=512 and a next ring providing a 192-bit security level has the dimension of n=1024, if a 128-bit security level is required, the dimension of n=1024 needs to be used, thereby sharply increasing a calculation amount or calculation time, which is required to generate the key.

SUMMARY

Technical Problem

Embodiments of the disclosure overcome the above disadvantages and other disadvantages not described above. In addition, the disclosure is not required to overcome the disadvantages described above, and an embodiment of the disclosure may not overcome any of the problems described above.

The disclosure provides an identity-based encryption method based on a lattice, which eliminates parameter rigidity, thereby enabling the flexible selection of a parameter and simultaneously securing its stability.

Solution to Problem

According to an embodiment of the disclosure, an identity-based encryption method based on a lattice includes: receiving identity information; randomly sampling small elements; generating a function-processed output value by function-processing the input identity information; and generating an encrypted text for a message by using the sampled small elements, the function-processed output value and a master public key, wherein the master public key is computed using a ring having a dimension (d) represented by a power of 2 and an integer multiplication of 3 or more.

In this case, the encryption method may further include: computing a trapdoor (T) used for the identity-based encryption method based on a lattice; and determining the computed trapdoor (T) as a master secret key.

In this case, the encryption method may further include: computing a first random matrix (S) in which the number of columns is smaller than the dimension by 1 and the number of rows is equal to the number of the dimension, by sampling elements ($\vec{f}_i$) linearly independent from each other in the ring; computing a second random matrix (A) in which the number of columns is equal to the number of the dimension and the number of rows is 1; and computing the master public key based on the second random matrix (A).

In this case, in the computing of the second random matrix, a d×d matrix ($M_i$) is computed by excluding an i-th row from a matrix ($[\vec{f}_1 \ldots \vec{f}_{d-1}] \in R_q^{d \times (d-1)}$), and $(-1)^{i-1} \cdot \det(M_i)$ is determined as a determinant ($a_i$), thereby computing $a_1^{-1} \cdot (a_1, a_2, \ldots, a_d)$ as the second random matrix.

In this case, the computing of the trapdoor (T) may include sampling of vector ($\vec{F} \in R_q^d$) that satisfies the relationship of $\det[\vec{f}_1 \| \ldots \| \vec{f}_{d-1} \| \vec{F}] = q$, in which $[\vec{f}_1 \| \ldots \| \vec{f}_{d-1} \| \vec{F}]$ may be computed as the trapdoor (T).

In this case, in the sampling of the vector, a result vector value may be output after reducing elements of the vector by using the elements ($\vec{f}_i$).

In this case, in the sampling of the vector ($\vec{F} \in R_q^d$), the elements of the vector may be reduced by removing a direction component of the elements by subtracting a constant multiple of the elements ($\vec{f}_i$) from the elements ($\vec{F} = (F, \ldots, F_d)$) of the vector.

Meanwhile, in the sampling of the vector ($\vec{F} \in R_q^d$), the elements of the vector may be reduced using an extended Euclidean algorithm.

Meanwhile, the encryption method may further include: computing a solution having a small size, in which the multiplication of the solution and the second random matrix (A) becomes a hash value, with respect to the function-processed output value; and determining a user secret key using the computed small solution.

In this case, the encryption method may further include decrypting the message from the encrypted text by using the user secret key.

Meanwhile, the identity information may be at least one of a social security number, an email address, a phone number, fingerprint information and iris information.

According to another embodiment of the disclosure, a calculation device includes: a memory storing at least one instruction and identity information; and a processor performing the at least one instruction, wherein the processor randomly samples small elements, generates a function-processed output value by function-processing the stored identity information, and generates an encrypted text for a message by using a master public key computed using a ring having a dimension (d) represented by a power of 2 and an integer multiplication of 3 or more, the sampled small elements and the function-processed output value.

In this case, the processor may compute a first random matrix (S) in which the number of columns is smaller than the dimension by 1 and the number of rows is equal to the number of the dimension, by sampling elements ($\vec{f}_i$) linearly independent from each other in the ring, compute a second random matrix (A) in which the number of columns is equal to the number of the dimension and the number of rows is 1, compute the master public key based on the second random matrix (A), and compute a trapdoor (T) used for the identity-based encryption method based on a lattice and determine the computed trapdoor (T) as a master secret key.

In this case, the processor may sample a vector that satisfies a predetermined relationship, in which a result vector obtained by reducing elements of the vector is computed as the trapdoor.

According to another embodiment of the disclosure, disclosed is a computer-readable recording medium including a program performing an identity-based encryption method based on a lattice, wherein the identity-based encryption method based on a lattice may include: receiving identity information; randomly sampling small elements; generating a function-processed output value by function-processing the input identity information; and generating an encrypted text for a message by using the sampled small elements, the function-processed output value and a master public key, the master public key being computed using a ring having a dimension (d) represented by a power of 2 and an integer multiplication of 3 or more.

Additional and/or other effects and advantages of the disclosure are set forth in part in the description which follows and, in part, are obvious from the description, or may be learned by practice of the disclosure.

Advantageous Effects of Invention

According to the various embodiments of the disclosure as described above, it is possible to flexibly select the parameter while satisfying the security required in the identity-based encryption method based on lattice, that is, to use an integer whose entire dimension is not the power of 2.

In addition, it is possible to freely select the parameters that are exactly suitable for the security, and it is thus possible to reduce the sizes of all the public key, secret key and encrypted text while increasing the overall efficiency of the algebraic higher-order (AHO) system.

BRIEF DESCRIPTION OF DRAWINGS

The above and/or other aspects of the disclosure are more apparent by describing certain embodiments of the disclosure with reference to the accompanying drawings, in which:

FIG. 10 is a diagram showing an extraction algorithm according to an embodiment of the disclosure;

FIG. 11 is a diagram showing an encryption algorithm according to an embodiment of the disclosure; and FIG. 12 is a diagram showing a decryption algorithm according to an embodiment of the disclosure.

DETAILED DESCRIPTION

Mode for Invention

Hereinafter, the disclosure is described in detail with reference to the accompanying drawings. An encryption/decryption may be used as needed in an information (data) transmission process performed in the disclosure, and all the expressions describing the information (data) transmission process in the disclosure and the claims need to be interpreted as including the encryption/decryption, even though not specifically mentioned. In a disclosure, expressions such as "transmitted (transferred) from A to B" and "received from B to A" may also include transmission (transfer) or reception performed having another medium interposed therebetween, and may not necessarily indicate only the direct transmission (transfer) or reception from A to B.

It needs to be understood that there is no limitation to the order of each step in the description of this specification, unless a preceding step is required to be performed logically and temporally before its subsequent step. That is, except for such an exceptional case, the essence of the disclosure is not affected even if a process described as the subsequent step is performed before a process described as the preceding step, and the scope of the disclosure also needs to be defined regardless of the order of the steps. In addition, "A or B" in the disclosure may be defined to mean not only selectively indicating any one of A and B, but also including both A and B. In addition, the term "including" in the disclosure may comprehensively include other additional elements in addition to the elements listed as including.

The term "module" or "unit" in the disclosure may be general-purpose hardware or software that performs its function, or it may be a logical combination of the hardware and the software.

The disclosure describes only essential components necessary to describe the disclosure, and does not mention components that are not related to the essence of the disclosure. In addition, it should not be exclusively interpreted that the disclosure includes only the mentioned elements, but it should be non-exclusively interpreted that the disclosure may include other elements.

The disclosure may be performed by an electronic calculation device in a mobile device or the like, which may perform an electronic calculation, such as a computer, a server or a smartphone. The mathematical calculation and computation performed in each step of the disclosure, which are to be described below, may be implemented as another calculation in case that a computer program is performed by a known coding method and/or a coding designed to be suitable for the disclosure in order to perform the calculation and computation. A computer program that performs the disclosure may be stored in a computer-readable recording medium.

In addition, the term "value" in the disclosure may be comprehensively defined to include all values that can be represented in mathematical expressions such as vectors, matrices, and polynomials as well as scalar values.

In the disclosure, obtaining a predetermined value by performing a calculation of encryption, hash or the like for a specific value may be defined as including a calculation of encryption, hash or the like for a modified value of the specific value (For example, another value computed through a process in which a predetermined value is additionally calculated on a specific value or the specific value is changed based on a predetermined rule) as well as the specific value.

The mathematical calculation and computation performed in each step of the disclosure, which are to be described below, may be implemented as the computer calculation by a known coding method and/or a coding designed suitable for the disclosure in order to perform the calculation and computation.

Each component of the device shown in the accompanying drawings of the disclosure may have any shape, size and dimension in which a function intended by the disclosure may be performed as well as its shape, size and dimension explicitly shown in the drawings.

A specific equation described below is an equation illustratively described among possible alternatives, and the scope of the disclosure should not be construed as being limited to the equation mentioned in the disclosure.

For the convenience of explanation, the disclosure uses notations decided as follows.

a←D: Element (a) is selected based on distribution (D).
s1, s2∈R: Each of S1 and S2 is an element in set (R).
mod (q): Modular is calculated by element (q).
⌈·⌉: An internal value is rounded.

Hereinafter, diverse embodiments of the disclosure are described in detail with reference to the accompanying drawings.

The disclosure proposes a generalized concept of a number theory research unit (NTRU) lattice referred to as a moduled-NTRU (MNTRU) lattice which may solve the dimensional flexibility of an NTRU-based encryption. This MNTRU lattice may show generation of a more efficient trapdoor than an existing NTRU trapdoor. Hereinafter, a new identity-based encryption may be applied first based on the MNTRU trapdoor.

An operation for generalizing the NTRU trapdoor is first described.

Similar to generalization from ring-LWE to module-LWE, the context of an NTRU lattice in $R^2$ may be generalized to an MNTRU lattice of high-level $R^d$.

First, if two small polynomials (f, g) are sampled from matrix $(s_{NTRU}:=(_{-f}^{g})\in \mathcal{R}^{2\times 1})$, f is assumed to be an inverse in the ring, an NTRU instance is defined as $h:=g/f\in \mathcal{R}_q$ and $(1, h)\in \mathcal{R}_q^2$ here, Equation 1 may be satisfied as follows.

$$(1, h) \cdot S_{NTRU} \equiv 0 \bmod q \quad \text{[Equation 1]}$$

Here, h is the NTRU instance and $S_{NTRU}$ is a matrix.

In addition, the NTRU lattice may be defined as in Equation 2 below.

$$A_{NTRU} := \{(u, v) \in \mathcal{R}^2 : u + vh \equiv 0 \bmod q\} \quad \text{[Equation 2]}$$

Here, $A_{NTRU}$ is the NTRU lattice and q is a prime number.

This content may be understood as an integer lattice in $Z^{2n}$ including uncommon short vectors (g and −f), and f and g may find F and G∈R, which satisfy following Equation 3, thereby generating the basis of an $A_{NTRU}$ trapdoor.

$$gF - fG = q \quad \text{[Equation 3]}$$

Here, g and f are short vectors, F and G are matrices, and q is a prime number.

An NTRU equation is the same as Equation 4 below.

$$T_{NTRU} = \begin{pmatrix} A(g) & A(G) \\ -A(f) & -A(F) \end{pmatrix} \quad \text{[Equation 4]}$$

Here, A is the anti-circulant matrix transform of the polynomial.

Such a framework may generalize case d≥2. To this end, an element having a small coefficient may first be sampled in $S_{MNTRU}\in R^{d\times(d-1)}$, and it is possible to construct vector $h_{MNTRU}=(h_1, \ldots, h_d)\in R_q^{d-1}$ that satisfies Equation 5 below.

$$(1, h_{MNTRU}) \cdot S_{MNTRU} \equiv 0 \bmod q \quad \text{[Equation 5]}$$

Based on this equation, an n-dimensional MNTRU lattice may be defined as in Equation 6 below.

$$A_{MNTRU,d} := \left\{(u_0, \ldots, u_{d-1}) \in \mathcal{R}^d : u_0 + \sum_{i=1}^{d} u_i h_i \equiv 0 \bmod q\right\} \quad \text{[Equation 6]}$$

Here, h ($h_1, \ldots, h_{d-1}$) may be determined by $det_i/det_1$, and mod q is the determinant of a submatrix where $det_i$ is (d−1)×($d_{-1}$) of $S_{MNTRU}$.

Based on this content, the trapdoor of the disclosure may be calculated as in Equation 7.

$$T_{MNTRU} \in \mathbb{Z}^{dn\times dn} = (A(S)\|A(F)) \quad \text{[Equation 7]}$$

Here, F is $F=(F_1, \ldots, F_d)^t \in \mathcal{R}^d$ and represents the MNTRU equation.

Hereinafter, a lattice structure capable of generating the above-described trapdoor is described with reference to FIG. 5.

Figure 5:
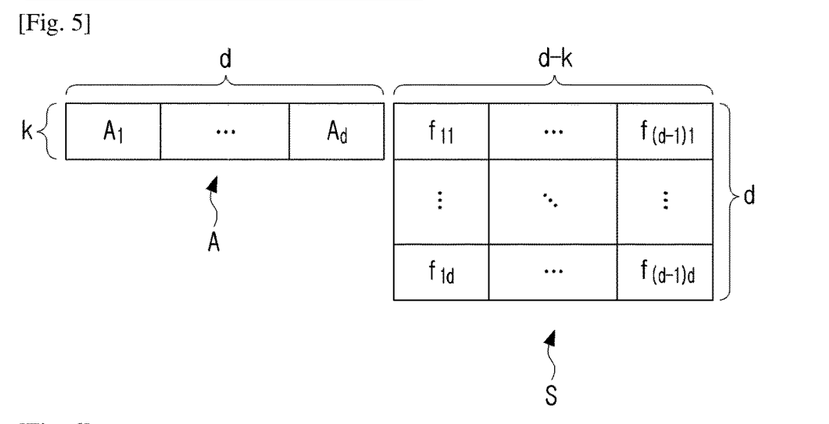
FIG. 5 is a diagram showing a structure of a random matrix of the disclosure.

FIG. 5 is a diagram showing a structure of a random matrix of the disclosure.

Referring to FIG. 5, a first random matrix (S) and a second random matrix (A) are used in the lattice structure according to the disclosure.

In the first random matrix (S), the number of columns is d-k (i.e., d−1), the number of rows (d) is 1, and in the second random matrix (A), the number of columns is (d), and the number of rows (k) is 1. Here, the number of columns (d) may be a predetermined integer greater than 2, and unlike the related art, the entire dimension may be determined to an integer other than a power of 2, thereby increasing parameter flexibility.

The first random matrix (S) and the second random matrix (A) may satisfy the relationship shown in FIG. 5.

Figure 6:
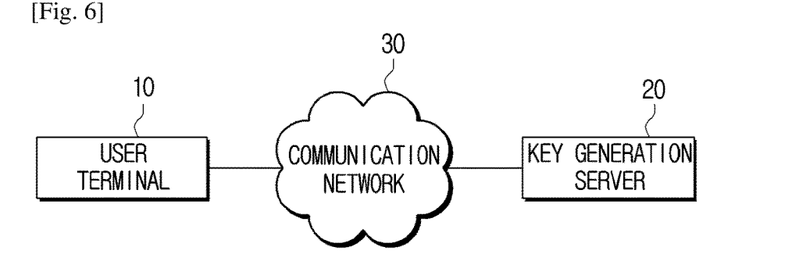
FIG. 6 is a diagram showing a structure of a network system according to an embodiment of the disclosure.

FIG. 6 shows an environment in which the identity-based encryption based on a lattice is performed according to the disclosure.

FIG. 6 is a diagram showing a structure of a network system according to an embodiment of the disclosure.

Referring to FIG. 6, a key generation server 20 may generate a master secret key, a master public key and an identity-based user secret key, which are required for identity-based encryption, and identity information (or user information) may be input to a user terminal 10 and transmitted to the key generation server 20 through a data communication network 30 and then used to generate the user secret key.

A network system may include the user terminal and the key generation server 20, and each component may be connected to each other through the data communication network 30.

The data communication network 30 may be implemented in various types of wired and wireless communication networks, broadcast communication networks, optical communication networks and cloud networks, and each device may be connected to each other in a way such as wireless fidelity (WiFi), bluetooth, near field communication (NFC) or the like without a separate medium.

FIG. 6 shows one user terminal, but a plurality of user terminals may be used. For example, the user terminal 10 may be implemented as various types of devices such as a smartphone, a tablet, a game player, a personal computer (PC), a laptop computer, a home server, a kiosk or the like, and a home appliance to which an internet of things (IOT) function is applied.

A user may input a variety of information through his/her user terminal 10. The input information may be stored in the user terminal 10 on its own, but may be transmitted to and stored in an external device for reasons such as storage capacity and security. In FIG. 6, the key generation server 20 may serve to store such information, and the key generation server 20 may serve to use some or all of the information stored in the key generation server 20.

The user terminal 10 may receive key information required for encryption from the key generation server 20, and may encrypt the message using the received key information. For example, the user terminal 10 may receive the master public key from the key generation server 20, and generate an encrypted text by encrypting the message using the received master public key. Here, the user terminal 10 may receive and use the small elements required for the encryption and a function-processed output value, or may generate and use the encrypted text on its own.

The user terminal 10 may then transmit the encrypted text to the key generation server 20. The user terminal 10 may also decrypt the encrypted text. For example, the user terminal 10 may generate the user secret key, and decrypt the encrypted text using the generated user secret key. Meanwhile, the key generation server 20 may perform the decryption operation. Specific encryption and decryption operations are described below.

The key generation server 20 may generate various key values used for the identity-based encryption based on a lattice. In detail, the key generation server 20 may first determine various parameters and rings, and then generate the master public key and the master secret key, based on the determined parameters and rings.

Here, the ring may be represented by Equation 8 as below.

$$\mathcal{R} := \mathbb{Z}[X]/(X^n + 1) \qquad \text{[Equation 8]}$$

Here, R is the ring and Z is a coefficient. Here, the ring is a set of polynomials having predetermined coefficients, and may indicate a set in which addition and multiplication between elements are defined and addition and multiplication are closed. This polynomial ring may be referred to as the ring.

Here, the ring is an integer coefficient polynomial ring of less than an Nth order of the elements, and addition and multiplication calculations are defined between the elements in the set. This polynomial ring may be referred to as the ring. For example, the addition calculation may be defined as a multiplication between polynomials, and the multiplication calculation may be defined as mod $x^N+1$ of the corresponding element after performing the multiplication between polynomials. According to this definition, $X^{N-1}*x$ is xN as the multiplication between polynomials and $X^N=-1$ for mod $X^N+1$, and accordingly, $X^{N-1}*x=-1$.

$$\mathcal{R}_q := \mathcal{R}/q\mathcal{R} = \mathbb{Z}_q[X]/(X^n + 1) \qquad \text{[Equation 9]}$$

In Equation 9, the ring is a set of polynomials of only the integer less than the Nth order and having coefficient within [0, q−1]. The addition and multiplication calculations are defined in the set, and for example, it may be defined as performing mod q for each coefficient while simultaneously performing the multiplication calculation for mod $x^N+1$.

The ring according to the disclosure has a dimension represented by the power of 2 and an integer multiplication of 2 or more, and a lattice trapdoor corresponding to such an order value may be used.

The key generation server 20 may compute the first and second random matrices based on the determined ring described above, and compute the trapdoor. Here, the trapdoor is special secret information that allows the inverse of a function that is difficult to be performed on its own to be calculated. The trapdoor in the disclosure is used in a lattice-based encryption technique as shown in FIG. 5, and its specific computation operation is described below with reference to FIG. 1.

The key generation server 20 may compute the master public key and the master secret key, based on the computed random matrix and trapdoor. A specific key generation operation is described below with reference to FIG. 1.

In addition, the key generation server 20 may receive the encrypted text from the user terminal 10 and store the encrypted text as it is without performing the decryption.

Meanwhile, FIG. 6 describes that the key generation server 20 generates keys required for the encryption, and the user terminal 10 receives some of the generated keys and then performs the encryption operation. However, the key generation operation, the encryption operation and the decryption operation may be performed in various devices depending on the environment.

Figure 1:
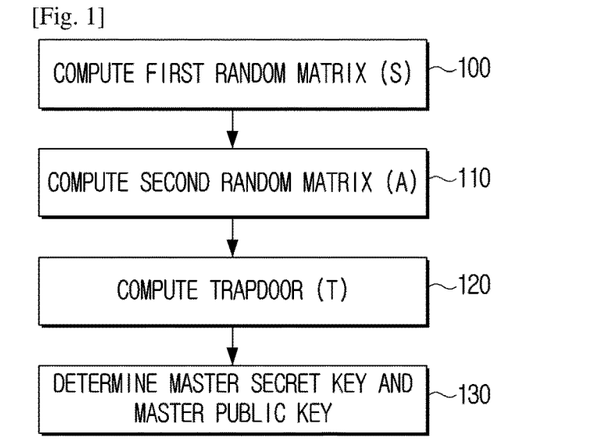
FIG. 1 is a flowchart showing operations of generating a master public key and a master secret key according to the disclosure.

FIG. 1 is a flowchart showing operations of generating a master public key and a master secret key according to the present disclosure.

Referring to FIG. 1, a first random matrix (S) is computed (100). For example, the first random matrix (S) may be computed by sampling element values that satisfy Equation 10 below.

$$\vec{f}_i = (f_{i1}, \ldots, f_{id}) \in R_q^d; i = 1, 2, \ldots, d-1 \quad \text{[Equation 10]}$$

Here, $\vec{f}_i$ indicates the sampled element values, and all the $\vec{f}_i$ values are linearly independent from each other in $R_q$. If the values are not linearly independent from each other, it is possible to resample element values.

A second random matrix (A) is then computed (110). In detail, the second random matrix (A) may be computed as shown in Equation 11 below by sampling a random coefficient (r) and using a determinant ($a_i$) corresponding to the number of rows of the first random matrix and the sampled random coefficient (r).

$$r \cdot (a_1, a_2, \ldots, a_d) \quad \text{[Equation 11]}$$

Here, the determinant ($a_i$) is $(-1)^{i-1} \cdot \det(M_i)$, and Mi is a d×d matrix excluding an i-th row from a matrix $[\vec{f}_1 \ldots \vec{f}_{d-1}] \in R_q^{d \times (d-1)}$. Here, r is a random coefficient $r(\in R_q)$.

For example, if the random matrix (A) is $a_1^{-1}$, the second random matrix (A) may be $(1, A_1, \ldots, A_{d-1})$.

A trapdoor (T) may then be computed (120). For example, the trapdoor (T) may be computed as shown in Equation 12 below by using the first random matrix (S) and a newly sampled $\vec{F}$.

$$T = \begin{bmatrix} \vec{f}_1 \| \ldots \| \vec{f}_{d-1} \| \vec{F} \end{bmatrix} \quad \text{[Equation 12]}$$

Here, T is the trapdoor, $\vec{f}_i$ is the element value of the first random matrix (S), and $\vec{F}$ is a short vector sampled from a ring to satisfy Equation 13 below. In addition, "||" indicates concatenation.

$$\det[\vec{f}_1 \| \ldots \| \vec{f}_{d-1} \| \vec{F}] = q \quad \text{[Equation 13]}$$

Here, det is a determinant calculation, $\vec{f}_i$ is the element value of the first random matrix (S), $\vec{F}$ is the sampled short vector, and q is a constant.

Hereinafter, a specific method of sampling the short vector ($\vec{F}$) is described below.

First, $\alpha_i$ satisfying $\Sigma_{i=1}^d \alpha_i \cdot \text{res}(\alpha_i) = 1$ may be calculated. Here, $\gcd(\text{res}(\alpha_i), \ldots, \text{res}(a_d)) = 1$ and $\text{res}(f) := \Pi_{k=0}^{n-1} f(x^{2k+1}) \in Z$ may be assumed.

*133$\alpha_i$ may be calculated by an extended Euclidean algorithm. In addition, $F_i$ may be computed as follows based on the above computation values.

$$F_i := q \cdot \alpha_i \cdot \prod_{k=0}^{n-1} a_1(x^{2k+1}) \quad \text{[Equation 14]}$$

In this way, the following relationship in Equation 15 is established.

$$\sum_{i=0}^d F_i \cdot a_i = q \quad \text{[Equation 15]}$$

($\vec{F} = (F_1, \ldots, F_d)$) is reduced by using $\vec{f}_i$, and then a result value ($\vec{F}$) may be output.

This reduction indicates a process in which a direction component of $\vec{f}_i$ is removed while subtracting an appropriate constant multiple of $\vec{f}_i$ from ($\vec{F} = (F_1, \ldots, F_d)$). This reduction may allow the trapdoor (T) to have a small size. Taking an integer as an example, in case that F=(2, 5) and f=(1, 2), if [F, f] and [F−2f, f] are compared to each other, the same column space may be defined, but a column of the subsequent reduced matrix may have a decreased size.

A master secret key and a master public key are then determined (130). In detail, the computed trapdoor (T) may be determined as the master secret key, and the master public key may be determined as $(A_1, \ldots, A_{d-1})$.

If the master secret key and the master public key are determined in this way, the master public key may be disclosed by having a hash function (H: $\{0,1\}^* \to R_q^d$) applied thereto, and a user secret key may be generated for each user. An operation of generating the user secret key is described below with reference to FIG. 2.

Figure 2:
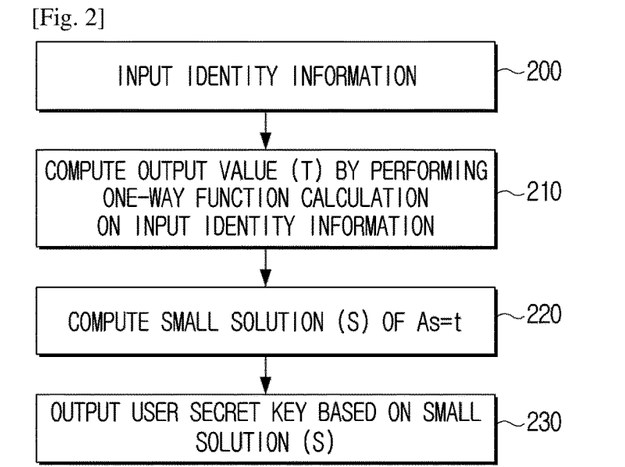
FIG. 2 is a flow chart showing an operation of generating a user secret key according to the disclosure.

FIG. 2 is a flow chart showing an operation of generating a user secret key according to the disclosure.

Referring to FIG. 2, the user may input identity information (id) by using a user terminal (200). Here, the identity information (id) may be information corresponding only to the user such as fingerprint information, email information and a phone number. Such identity information may be transmitted from the user terminal to a server, and the server may use the received identity information to generate the user secret key.

An output value (t) ($t \leftarrow (H(id), 0, \ldots, 0) \in R_q^d$) may then be computed by performing a one-way function calculation, i.e. hash calculation, on the input identity information (id) (210).

A solution ($s = (s_0, s_1, \ldots s_{d-1}) \in R^d$) having a small size, that satisfies Equation 16 below may then be computed (220). A specific computation operation is described below with reference to FIG. 10.

$$As = t \quad \text{[Equation 16]}$$

The stability of this process is ensured by a mathematical assumption that the process is difficult to be performed without a master secret key (T).

Based on the small solution (s) computed in advance, a user secret key ($SK_{id}$) may then be output as shown in Equation 17 below (230).

$$sk_{id} = (s_1, \ldots s_{d-1}) \in R^{d-1} \quad \text{[Equation 17]}$$

Here, $SK_{id}$ is the user secret key, and $S_1, \ldots, S_{d-1}$ is the computed small solution (s).

Figure 3:
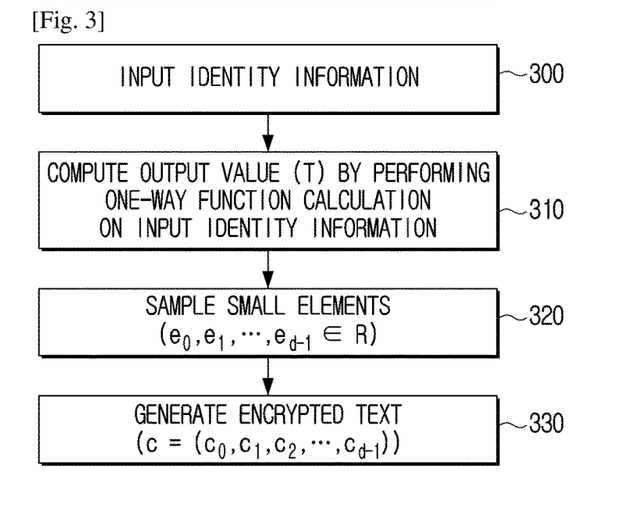
FIG. 3 is a flowchart showing an operation of generating an encrypted text according to the disclosure.

FIG. 3 is a flowchart showing an operation of generating an encrypted text according to the disclosure. In detail, FIG. 3 shows a process in which a message (m) is encrypted based on a master public key (MPK).

Referring to FIG. 3, the user may input identity information (id) by using the user terminal (300). Here, the identity information (id) may be information corresponding only to the user such as the fingerprint information, the email information and the phone number. Here, various types of information as described above may be used for the identity information (id). However, the identity information used in an encryption process and identity information used in the process of generating the user secret key shown in FIG. 2 may be the same as each other.

An output value (t) $t \leftarrow (H(id), 0, \ldots, 0) \in R_q^d$ may then be computed by performing the one-way function calculation, i.e. the hash calculation, on the input identity information (id) (310).

Small elements (r, $e_0, e_1, \ldots, e_{d-1} \in R$) may then be sampled (S320). Here, r may be determined to be $a_1^{-1}$.

An encrypted text (c) for the message (m) may then be generated as shown in Equation 18 below using the sampled elements, the hash output value (t) and the master public key (MPK) (330). A more specific operation of generating the encrypted text is described below with reference to FIG. 11.

$$c = (c_0, c_1, \ldots, c_{d-1}) = \quad \text{[Equation 18]}$$
$$\left(a_1^{-1} t + e_0 + \lfloor q/2 \rfloor m, a_1^{-1} A_1 + e_1, \ldots, a_1^{-1} A_{d-1} + e_{d-1}\right)$$

Here, c is the encrypted text; m is the message; each of r, $e_0$ and $e_1$ indicates a random value; t is the output value; and $\lfloor * \rfloor$ is a value rounded down to an integer *.

Hereinafter, a decryption operation is described with reference to FIG. 4.

Figure 4:
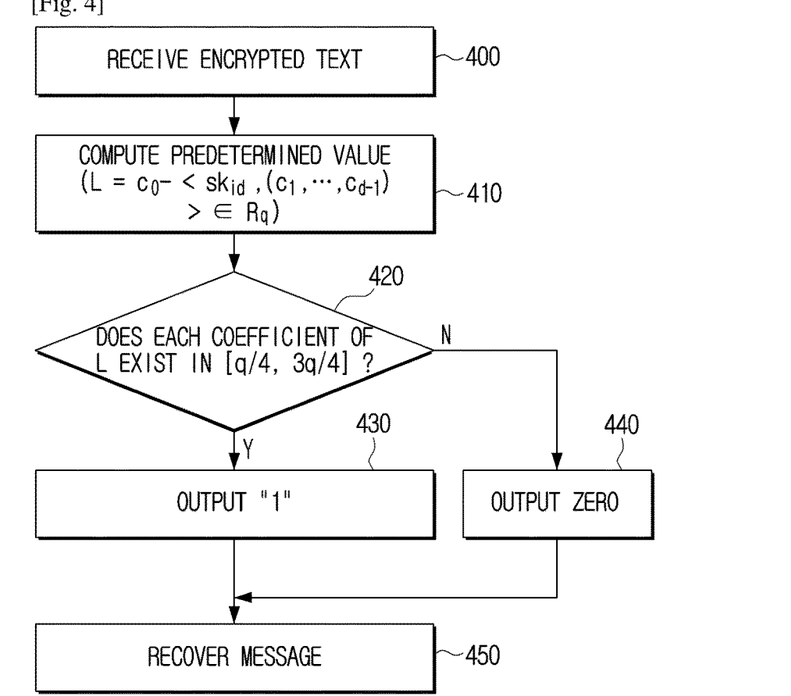
FIG. 4 is a flowchart showing a message decryption operation according to the disclosure.

FIG. 4 is a flowchart showing a message decryption operation according to the disclosure.

First, the encrypted text is received (400). In order to decrypt the encrypted text (c), the user needs to have the user secret key ($sk_{id}$) as described above. The user secret key may be generated and stored in advance, or may be generated and used at the time of decrypting the encrypted text.

A predetermined value is then computed using the above-described user secret key and the encrypted text (410).

$$L = c_0 - <sk_{id}, (c_1, \ldots, c_{d-1})> \in R_q \quad \text{[Equation 19]}$$

Here, L is the predetermined value, $c_0$ is a value of the first element in the encrypted text, and $sk_{id}$ is the user secret key. In addition, <Vector 1 and Vector 2> indicate the inner product calculation of vector 1 and vector 2.

As a result of the calculation, it is then determined whether each coefficient of L exists in [q/4, 3q/4] (420).

If it is determined that each coefficient of L exists in [q/4, 3q/4] based on the result of the calculation, "1" is output (430), and if not, zero is output (440), and the message may be recovered (450). Here, 1 and 2 are the coefficients of the polynomial.

Figure 7:
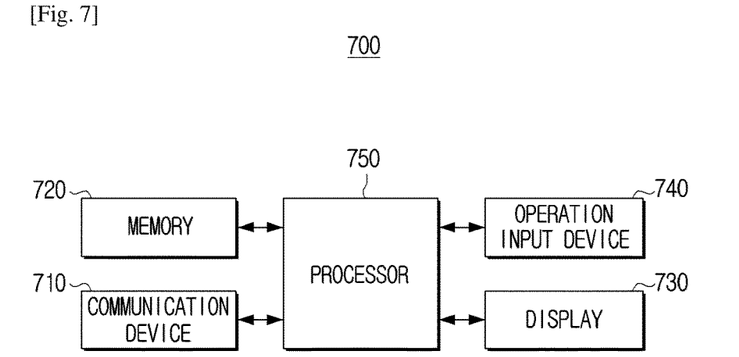
FIG. 7 is a block diagram showing a configuration of a calculation device according to an embodiment of the disclosure.

FIG. 7 is a block diagram showing a configuration of a calculation device according to an embodiment of the disclosure.

In detail, the calculation device may be referred to as a device that performs the encryption such as the user terminal, a device that generates a key required to generate the encrypted text such as the key generation server, and a device that uses the encrypted text, in the system of FIG. 6. Such a calculation device may be various devices such as a personal computer (PC), a laptop computer, a smartphone, a tablet or a server.

Referring to FIG. 7, a calculation device 700 may include a communication device 710, a memory 720, a display 730, an operation input device 740 and a processor 750.

The communication device 710 may be formed to connect the calculation device 700 to an external device (not shown), and may be connected to the external device through a local area network (LAN) and the internet network or be connected to the external device through a universal serial bus (USB) port or a wireless communication (for example, wireless fidelity (WiFi) 802.11a/b/g/n, near field communication (NFC) or bluetooth) port. This communication device 710 may also be referred to as a transceiver.

The communication device 710 may receive various keys required to generate the encrypted text, and may transmit its own generated key to the external device. Here, the key may be a master public key, a master secret key, a user secret key, etc.

In addition, the communication device 710 may receive a message from the external device, and may transmit the generated encrypted text to the external device.

In addition, the communication device 710 may receive various parameters required to generate the key or the encrypted text from the external device. Meanwhile, the various parameters may be implemented to be directly input from the user through the operation input device 740 to be described below.

In addition, the communication device 710 may receive the encrypted text.

The memory 720 is a component for storing an operating system (OS), various software, data and the like for driving the calculation device 700. The memory 720 may be implemented in various types of devices such as a random access memory (RAM), a read-only memory (ROM), a flash memory, a hard disk drive (HDD), external memory, memory card or the like, and is not limited thereto.

The memory 720 may store the identity information. Here, the identity information may be a social security number, an email address, a phone number, fingerprint information, iris information or the like, and may be used in case that the user secret key or the encrypted text is generated.

In addition, the memory 720 may store a message to be encrypted. Here, the message may be various types of credit information and personal information cited by the user, and may also be information related to a usage history, such as location information, information on time spent using the internet and the like, which are used in the calculation device 700.

In addition, the memory 720 may store the master public key, and may store the master secret key and the various parameters required to generate the master public key and the master secret key as well as the master secret key in case that the calculation device 700 is a device that directly generates the master public key.

The memory 720 may also store the encrypted text generated in a process described below. The memory 720 may also store intermediate data and the like during the generation of the encrypted text.

The memory 720 may also store the encrypted text transmitted from the external device. In addition, the memory 720 may store a message that is a result of decrypting the encrypted text.

The display 730 may display a user interface window for the user to select a function supported by the calculation device 700. For example, the display 730 may display the user interface window for the user to select various functions provided by the calculation device 700. The display 730 may be a monitor such as a liquid crystal display (LCD), organic light emitting diodes (OLED) or the like, and may be implemented as a touch screen which may simultaneously perform a function of the operation input device 740 to be described below.

The display 730 may display a message requesting for the user to input the parameters required to generate the master secret key and the master public key. The display 730 may also display a user interface (UI) requesting the user to select a message of an encryption target. For example, the display 730 may display the UI for the user to select user identity information to be used for the identity-based encryption based on a lattice.

Meanwhile, the encryption target may be implemented to be directly selected by the user or automatically selected. That is, personal information required to be encrypted may be automatically determined even though the user does not directly select the message.

The operation input device 740 may receive a function selection of the calculation device 700 and a command for controlling the corresponding function from the user. For example, the operation input device 740 may receive the parameters required to generate the master secret key and the master public key from the user. In addition, the operation input device 740 may receive the determined message to be encrypted from the user.

The processor 750 may control each component in the calculation device 700. The processor 750 may be configured of a single device such as a central processing unit (CPU) or an application-specific integrated circuit (ASIC), or may be configured of a plurality of devices such as the CPU, a graphics processing unit (GPU), etc.

If a message to be transmitted is input, the processor 750 may store the message in the memory 720. The processor 750 may encrypt the message by using a variety of determined values and programs stored in the memory 720. In this case, the public key may be used.

The processor 750 may generate and use the master public key required to perform the encryption on its own, or may use the master public key received from the external device. For example, the key generation server 20 performing the decryption may distribute the master public key to another device.

In case that the key generation server 20 generates the master public key on its own, the processor 750 may generate the first random matrix (S) and the second random matrix (A), which are shown in FIG. 5, to be generated, and the master public key based on the second random matrix. A specific operation of generating the key is described below with reference to FIG. 9.

In case that the master public key is generated, the processor 750 may control the communication device 710 to transmit the key to another device.

The processor 750 may also generate the encrypted text for the message. For example, in case that the identity information is input, the processor 750 may generate the function-processed output value by function-processing the input identity information. In addition, the processor 750 may randomly sample the small elements, and generate the encrypted text for the message by using the sampled small elements, the function-processed output value and the master public key. A more specific encryption operation performed by the processor 750 is described below with reference to FIG. 11.

In addition, the processor 750 may store the encrypted text in the memory 720, and may control the communication device 710 to transmit the same encrypted text to another device based on a user request or a predetermined default command.

The processor 750 may generate the user secret key based on the master public key and the identity information.

The processor 750 may also decrypt the encrypted text by using the user secret key. A decryption operation is described below with reference to FIG. 12.

As described above, the calculation device according to the disclosure may perform the encryption processing using the ring having the dimension represented by the power of 2 and the integer multiplication of 2 or more. The calculation amount or the calculation time, which is required to generate the key, may be reduced because it is possible to use the dimension represented by the power of 2 and the integer multiplication without the need to double the dimension to increase security of the key.

Meanwhile, FIG. 7 shows and describes that one device performs both the encryption and decryption operations, but the one device may be implemented to perform one operation, for example, only one of the key generation operation, the encryption operation and the decryption operation.

Figure 8:
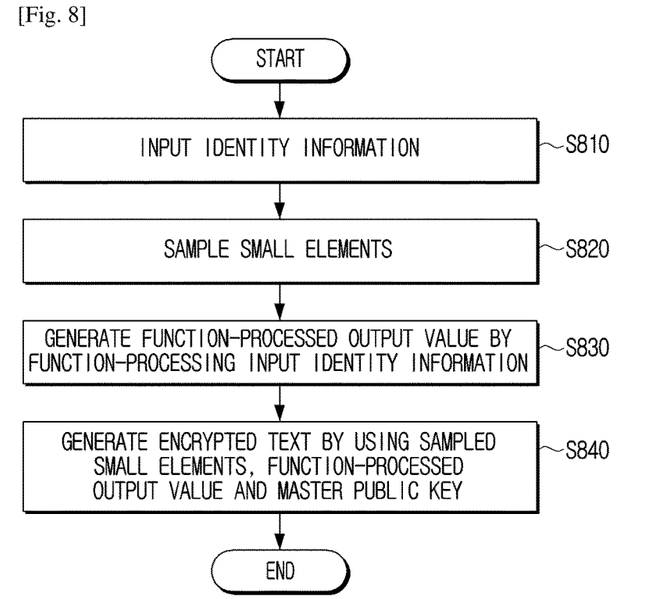
FIG. 8 is a flowchart showing an encryption method according to an embodiment of the disclosure.

FIG. 8 is a flowchart showing an encryption method according to an embodiment of the disclosure.

Referring to FIG. 8, the identity information may first be input (S810). For example, the input identity information may be the social security number, the email address, the phone number, the fingerprint information, or the iris information. Such identity information may be stored in advance.

The small elements may be randomly sampled (S820). For example, the small elements $(r, e_0, e_1, \ldots, e_{d-1} \in R)$ may be sampled. Here, r may be determined to be $a_1^{-1}$.

The function-processed output value may be then generated by function-processing the input identity information (S830). Here, the function-processing may refer to the hash processing, and it is possible to output the function-processed output value (t), which is obtained by hashing the identity information.

The encrypted text for the message may then be generated by using the sampled small elements, the function-processed output value and the master public key (S840). Here, the master public key may be a key computed using the ring having a dimension (d) represented by the power of 2 and an integer multiplication of 3 or more, and the encrypted text may be calculated in the same manner as in Equation 18.

The encryption method described above may reduce the calculation amount or the calculation time, which is required to generate the key, because it is possible to use the dimension represented by the power of 2 and the integer multiplication without the need to double the dimension to increase the security of the key.

Meanwhile, the encryption method according to the various embodiments described above may be implemented as a program code for performing each step, and may be stored in a recording medium and also be distributed. In this case, a device mounting the recording medium thereon may perform the above-described operations of the encryption method.

This recording medium may be one of various types of computer-readable media such as a read-only memory (ROM), a random access memory (RAM), a memory chip, a memory card, an external hard drive, a hard drive, a compact disk (CD), a digital versatile disk (DVD), a magnetic disk and a magnetic tape.

Figure 9:
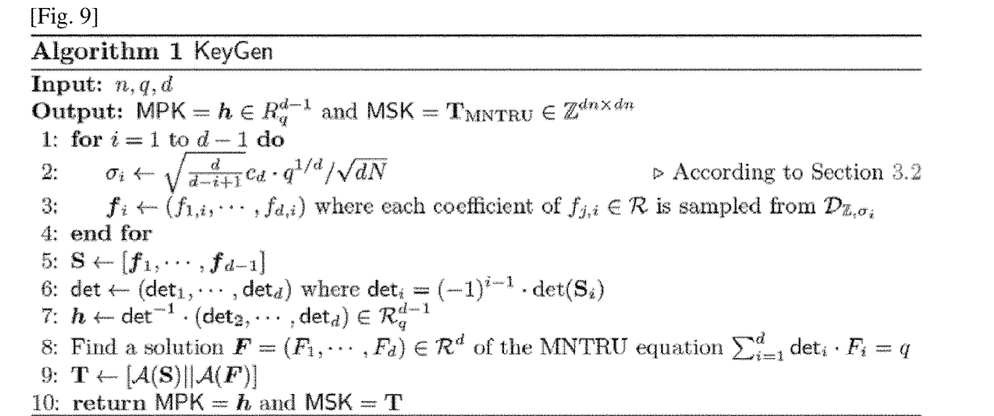
FIG. 9 is a diagram showing a key generation algorithm according to an embodiment of the disclosure.

FIG. 9 is a diagram showing a key generation algorithm according to an embodiment of the disclosure.

Referring to FIG. 9, three parameters (n, q and d) may be input. Here, n is a value multiplied by the power of 2 representing the dimension, and d is an integer. Therefore, $2^n * d$ may be the dimension of the ring generated by the corresponding parameter. Here, q is a decimal value.

The trapdoor (T) may then be computed using the input parameters and the algorithm as shown. For example, it is possible to compute the first random matrix (S) in which the number of columns is smaller than the dimension by 1 and the number of rows is equal to the number of the dimension and the second random matrix (A) in which the number of columns is equal to the number of the dimension and the number of rows is 1, by sampling elements ($\vec{f}_i$) linearly independent from each other in the ring.

Here, in the second random matrix (A), the d×d matrix ($M_i$) may be computed by excluding the i-th row from the matrix $[\vec{f}_1 \ldots \vec{f}_{d-1}] \in R_q^{d \times (d-1)}$, and $a_1^{-1} \cdot (a_1, a_2, \ldots, a_d)$ may be computed by determining $(-1)^{i-1} \cdot \det(M_i)$ as the determinant ($a_i$).

In addition, a vector ($\vec{F} \in R_q^d$) that satisfies the relationship of $\det[\vec{f}_1 \| \ldots \| \vec{f}_{d-1} \| \vec{F}] = q$ may be sampled, and $[\vec{f}_1 \| \ldots \| \vec{f}_{d-1} \| \vec{F}]$ may then be computed as the trapdoor (T). Here, the vector ($\vec{F} \in R_q^d$) may be sampled in such a manner that a result vector value is output after reducing elements of the vector by using the elements ($\vec{f}_i$). For example, the elements of the vector may be reduced by removing a direction component of the elements by subtracting a constant multiple of the elements ($\vec{f}_i$) from the elements ($\vec{F} = (F_1, \ldots, F_d)$) of the vector using the extended Euclidean algorithm.

In case that the trapdoor is computed, the trapdoor (T) may be determined as the master secret key (MSK), and an h value ($\det^{-1} \cdot (\det_2, \ldots, \det_d) \in \mathcal{R}_q^{d-1}$) used to calculate all the random matrices may be determined as the master public key (MPK).

Hereinafter, an operation of generating the user secret key by using the master secret key and the master public key, which are generated through such a process, is described below with reference to FIG. 10.

FIG. 10 is a diagram showing an extraction algorithm according to an embodiment of the disclosure.

Referring to FIG. 10, it is possible to receive the identity information (id), a master secret key (T), a master public key (h) and a processing function (e.g. hash function H).

For example, if the input identity information is the same as existing identity information, it is possible to output the user secret key pre-generated corresponding thereto.

If the input identity information is different from the existing identity information, the identity information may be function-processed output, and the value (t) may be computed using the function-processed output identity information.

It is then possible to select a standard deviation (σ) as shown, compute (c) by a Gaussian Sampler, compute a solution ($s=(s_0, s_1, \ldots, s_{d-1})$) having a small size, in which the multiplication of the solution and the second random matrix becomes a hash value, and output the remaining solution ($s_1, \ldots, s_{d-1}$) excluding $s_0$ among the computed small solutions as the user secret key.

FIG. 11 is a diagram showing an encryption algorithm according to an embodiment of the disclosure.

Referring to FIG. 11, it is possible to receive the identity information (id), a message (μ), the master public key (h) and the processing function (e.g. hash function H).

First, r and $e_i$ polynomials may be sampled by sampling the small elements.

An ephemeral key (k) may then be computed, and the function-processed value (t) may be calculated by processing the identity information using the processing function.

It is possible to compute the coefficient of the polynomial having an error value through this process, and generate the encrypted text (C=(c, c')) for the message using the above-described value.

FIG. 12 is a diagram showing a decryption algorithm according to an embodiment of the disclosure.

Referring to FIG. 12, it is possible to receive the encrypted text (C), the user secret key ($sk_{id}$) and the processing function (e.g. hash function).

An element value (s') may first be computed using the user secret key, and a value (w) may then be computed using the encrypted text and the computed element value. The value (w) may be calculated in Equation 20 below.

$$w = \langle c, (1, -sk_{id}) \rangle = \left\lfloor \frac{q}{2} \right\rfloor \cdot m + e_0 + rs_0 - \sum_{i=1}^{d-1} e_i s_i \quad \text{[Equation 20]}$$

Here, c is the encrypted text and $sk_{id}$ is the user secret key.

If the value (w) is computed, the ephemeral key (k) may be computed, and the message may be decrypted using the function-processed ephemeral key and the encrypted text.

According to the various embodiments of the disclosure as described above, it is possible to flexibly select the parameter while satisfying the security required in the identity-based encryption method based on lattice, that is, to use an integer whose entire dimension is not the power of 2.

In addition, it is possible to freely select the parameters that are exactly suitable for the security, and it is thus possible to reduce the sizes of all the public key, secret key and encrypted text while increasing the overall efficiency of the algebraic higher-order (AHO) system.

Although the disclosure has been described with reference to the accompanying drawings, the scope of the disclosure is not construed as being limited to the described embodiments and/or drawings, but is defined by the appended claims. In addition, it is to be clearly understood that the improvements, changes and modifications of the disclosure as described in the claims, which are obvious to those skilled in the art, are included in the scope of the disclosure.

The invention claimed is:

1. An identity-based encryption method based on a lattice, comprising:
    receiving identity information;
    randomly sampling small elements;
    generating a function-processed output value by function-processing the input identity information;
    computing a trapdoor (T) used for the identity-based encryption method based on a lattice; and
    determining the computed trapdoor (T) as a master secret key,
    computing a first random matrix (S) in which the number of columns is smaller than the dimension by 1 and the number of rows is equal to the number of the dimension by sampling elements ($\vec{f}_l$) linearly in-dependent from each other in the ring;
    computing a second random matrix (A) in which the number of columns is equal to the number of the dimension and the number of rows is 1;
    computing the master public key based on the second random matrix (A);
    generating an encrypted text for a message by using the sampled small elements, the function-processed output value and the master public key, wherein the master public key is computed using a ring having a dimension (d) other than a power of two represented by a multiplication of a power of 2 and an integer of 3 or more,
    computing a solution having a small size, in which the multiplication of the solution and the second random matrix (A) becomes a hash value, with respect to the function-processed output value; and
    determining a user secret key using the computed small solution.

2. The identity-based encryption method based on a lattice, as claimed in claim 1,
    wherein in the computing of the second random matrix, a dXd matrix ($M_i$) is computed by excluding an i-th row from a matrix $$[\vec{f_1} \ldots \vec{f_{d-1}}] \in R_q^{d \times (d-1)}, \text{ and } (-1)^{i-1} \cdot \det(M_i)$$

is determined as a determinant ($a_i$), thereby computing $$a_1^{-1} \cdot (a_1, a_2, \ldots, a_d)$$

as the second random matrix.

3. The identity-based encryption method based on a lattice, as claimed in claim 2, wherein the computing of the trapdoor (T) includes sampling of vector $$(\vec{F} \in R_q^d)$$

that satisfies the relationship of $$\det \vec{f} \| \ldots \| \vec{f_{d-1}} \| \vec{F} = q, \text{ in which } [\vec{f} \| \ldots \| \vec{f}_{d-1} \| \vec{F}]$$

is computed as the trapdoor (T).

4. The identity-based encryption method based on a lattice, as claimed in claim 3, wherein in the sampling of the vector $$(\vec{F} \in R_q^d),$$

a result vector value is output after reducing elements of the vector by using the elements ($\vec{f}_l$).

5. The identity-based encryption method based on a lattice, as claimed in claim 4, wherein in the sampling of the vector $$(\vec{F} \in R_q^d),$$

the elements of the vector are reduced by removing a direction component of the elements by subtracting a constant multiple of the elements ($\vec{f}_l$) from the elements $$(\vec{F} = (F_1, \ldots, F_d))$$

or the vector.

6. The identity-based encryption method based on a lattice, as claimed in claim 4, wherein in the sampling of the vector $$(\vec{F} \in R_q^d),$$

the elements of the vector are reduced using an extended Euclidean algorithm.

7. The identity-based encryption method based on a lattice, as claimed in claim 1, further comprising: decrypting the message from the encrypted text by using the user secret key.

8. The identity-based encryption method based on a lattice, as claimed in claim 1, wherein the identity information is at least one of a social security number, an email address, a phone number, fingerprint information and iris information.

9. A calculation device comprising:
    a memory storing at least one instruction and identity information; and a processor performing the at least one instruction,
    wherein the processor randomly samples small elements,
    generates a function-processed output value by function-processing the stored identity information,
    computes a trapdoor (T) used for the identity-based encryption method based on a lattice and determines the computed trapdoor (T) as a master secret key,
    computes a first random matrix (S) in which the number of columns is smaller than the dimension by 1 and the number of rows is equal to the number of the dimension, by sampling elements ($\vec{f}_l$) linearly independent from each other in the ring,
    computes a second random matrix (A) in which the number of columns is equal to the number of the dimension and the number of rows is 1, computes the master public key based on the second random matrix (A), generates an encrypted text for a message by using a master public key computed using a ring having a dimension (d) other than a power of two represented by a multiplication of a power of 2 and an integer of 3 or more, the sampled small elements and the function-processed output value, computes a solution having a small size, in which the multiplication of the solution and the second random matrix (A) becomes a hash value, with respect to the function-processed output value; and determines a user secret key using the computed small solution.

10. The calculation device as claimed in claim 9, wherein the processor samples a vector that satisfies a predetermined relationship, in which a result vector obtained by reducing elements of the vector is computed as the trap door.

11. A non-transitory computer-readable recording medium including a program performing an identity-based encryption method based on a lattice, wherein the identity-based encryption method based on a lattice includes:

receiving identity information; randomly sampling small elements;

generating a function-processed output value by function-processing the input identity information;

computing a trapdoor (T) used for the identity-based encryption method based on a lattice; and determining the computed trapdoor (T) as a master secret key, computing a first random matrix (S) in which the number of columns is smaller than the dimension by 1 and the number of rows is equal to the number of the dimension by sampling elements $$(\vec{f}_i)$$

linearly independent from each other in the ring;

computing a second random matrix (A) in which the number of columns is equal to the number of the dimension and the number of rows is 1;

computing the master public key based on the second random matrix (A); and generating an encrypted text for a message by using the sampled small elements, the function-processed output value and a master public key, wherein the master public key being computed using a ring having a dimension (d) other than a power of two represented by a multiplication of a power of 2 and an integer of 3 or more, computing a solution having a small size, in which the multiplication of the solution and the second random matrix (A) becomes a hash value, with respect to the function-processed output value; and determining a user secret key using the computed small solution.

12. The identity-based encryption method based on a lattice, as claimed in claim 1, wherein the solution is a solution vector and the computing the solution includes using a Gaussian Sampler.

* * * * *